Sept. 29, 1964 R. S. MACKAY ETAL 3,150,521
TONOMETER
Filed July 7, 1961

INVENTORS
RALPH S. MACKAY
ELWIN MARG
RAYMOND W. OECHSLI
ATTY.

United States Patent Office 3,150,521
Patented Sept. 29, 1964

3,150,521
TONOMETER
Ralph S. Mackay, San Francisco, and Elwin Marg and Raymond W. Oechsli, Berkeley, Calif., assignors to The Regents of the University of California, Berkeley, Calif.
Filed July 7, 1961, Ser. No. 122,439
3 Claims. (Cl. 73—80)

This invention relates to improvements in measuring the internal pressure within spherical objects having a deformable wall structure. More particularly, the invention relates to an improved tonometer for rapidly and accurately measuring intraocular pressure, i.e., the pressure within a human eyeball. This application is a continuation-in-part of application Serial No. 821,254, filed on June 18, 1959, now abandoned.

Intraocular pressure is measured in the diagnosis and treatment of glaucoma, a disease characterized by abnormally high pressure within the eyeball, which, if it persists, leads to irreversible blindness. Tonometers have long been used to measure intraocular pressure, but heretofore they have been crude and relatively inaccurate instruments which could be successfully operated only by one having a high degree of skill. This limited performance of the prior-art tonometers has presented a serious problem since, without a consistently accurate tonometer, glaucoma cannot be detected in its early stages, when the intraocular pressure may have increased only slightly over normal.

The present invention has overcome the disadvantages of the classic prior-art tonometers and has solved the problem of providing a fast yet consistently accurate measurement of intraocular pressure while eliminating the extraneous error factors which heretofore prevented accurate pressure measurements. No indentation of the eyeball is necessary, and the pressure measurement is obtained during a fast but light and gentle contact with the eyeball which momentarily flattens a portion of its surface.

An important and unique principle of our invention which makes possible the above operational advantages, is that of providing a probe-like instrument having a flat pressure plate surrounding a normally co-planar pressure sensitive member which can be pressed gently against the eyeball to flatten a small area of it to obtain the intraocular pressure. By this means an accurate reading of intraocular pressure can be taken and recorded since the bending forces of the cornea are no longer pushing on the central pressure-sensitive member but only on the surrounding, non-sensitive, co-planar area. Thus, the need for calibration and other error compensating devices for corneal deformation has been eliminated and our invention measures directly the internal eyeball pressure. In addition, the surface tension forces of tears are also avoided as an artifact in the pressure reading. Corneal astigmatism is of no consequence since only the pressure from the central part of the flattened area is registered. Also, the factors of eye size, condition of the epithelium, and ocular rigidity do not affect the accuracy of our tonometer. Since it has a smooth contact surface, the tonometer probe tip of our invention can be covered by a thin rubber film (receptacle-end condom) to prevent the transfer of infectious eye diseases from one patient to another. When used, our tonometer may be applied in any orientation and reading will be equally valid as long as it is not shifted between the initial contact and the initial trough, a fraction of a second.

A particular object of the present invention is to provide an improved tonometer having the aforementioned operational advantages with reduced complexity, and yet increased reliability and accuracy. Our invention solves these problems by providing an accurate, efficient means for measuring pressure against the central pressure-sensitive element while eliminating the need for a feed-back system to reposition it axially after each measurement. The present invention is characterized by a novel combination of a resiliently mounted element that senses the intraocular pressure and provides an electrical signal in response thereto which can be amplified and recorded for quantitative analysis. The problem of feed-back is eliminated since very little deflection of the pressure-sensitive element is required and it automatically returns to its zero or datum level position of co-planarity with a surrounding pressure plate by novel mechanical means after every eyeball contact.

Another object of our invention is to provide a tonometer that utilizes electrical energy produced by pressure exerted on a crystal having piezo-electrical properties to obtain a value of intraocular pressure.

Another object is to provide a tonometer having a combination of elements with relatively low mass so that inertia effects are minimal when intraocular measurements are desired to be taken of a patient subjected to extreme acceleration.

Another advantage of our invention is that little skill is required to achieve consistently accurate results. Thus, the diagnosis and screening service can be made available to a greater number of people.

Our new tonometers rapidly obtain the eyeball pressure without the need of anesthetics and the patient may be examined in any bodily orientation. Furthermore, the present tonometer requires contact on the eyeball for only about one second as opposed to much greater times of contact required by the classic tonometers heretofore used. No damage is done to the eye during the pressure measurement even if the measurements are repeated. With the present invention contact is equally effective with all portions of the eyeball, including the cornea, and this is extremely important when corneal sensitivity is a problem.

Other objects, features and advantages of the present invention will be apparent from the following description and from the drawings in which.

Figure 1:
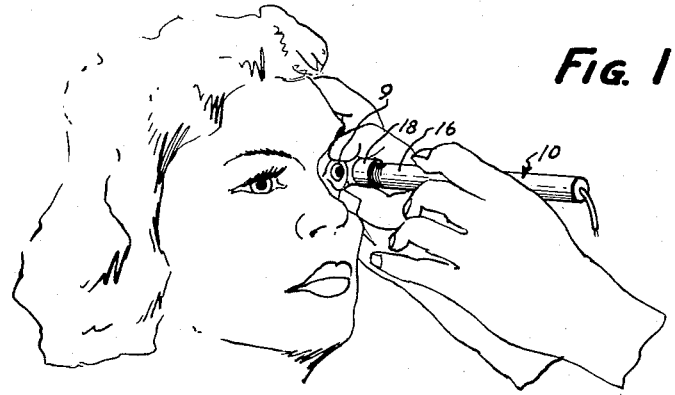
FIG. 1 is a view in perspective of a tonometer embodying the principles of the present invention and being used on a patient, where it is about to engage the patient's eyeball.

Broadly considered, the present invention is directed to an improved apparatus for rapidly and accurately measuring intraocular pressure, especially of a human eyeball but also for animal eyeballs. The invention is used, as shown in FIG. 1, by momentarily engaging the patient's eyeball 9 with a probe-type instrument 10.

Figure 2:
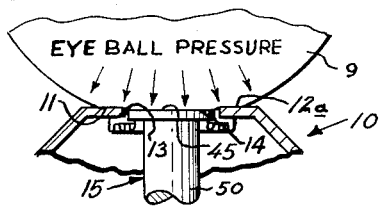
FIG. 2 is a diagrammatic view in elevation and partly in section of a portion of our new tonometer in contact with an eyeball and flattening it according to the present invention. The various forces resisting deformation are indicated.

The engagement of the probe 10 with the eyeball 9, as schematically shown in FIG. 2, entails the momentary flattening of a portion 11 of the eyeball 9, by a substantially flat annular pressure member 12 on the end of the probe 10, which surrounds a central open area 13. (The term "probe" is here used in the electronic sense, that is, a hand-held contact device that carries a sensing means which transmits the pressure data.) Flattening the eyeball portion 11 overcomes the extraneous forces resisting its deformation, such as the bending forces of the eyeball wall and the surface tensions of tears. A small surface area 14 of the eyeball 9 exposed at the open center area 13 on the end of the probe 10 then tends to bulge out slightly into the area 13, due solely to the internal eyeball pressure. This pressure is then measured directly, by the pressure-sensing device 15 of the present invention located at the open center area 13 and adapted for measuring only the internal eyeball pressure.

The present invention's above described structural features are combined in a unique manner with a pressure-sensitive transducer that utilizes the properties of piezo-electricity. The piezo-electricity phenomenon is well known in the field of sound reproduction and in the present invention it is applied in a new combination of elements to provide a tonometer that is rugged, reliable and highly accurate. The properties of this phenomenon occur when a small plate of material is cut in a definite way from crystals of quartz, and a few other substances. If the crystal is compressed along a definite axis there will be a shift of electrons, so that one face of the crystal will be charged positively, and the other face will be charged negatively. Thus, when pressure is placed on such a crystal, it will produce a voltage proportional to the pressure which can then be amplified and measured to give a quantitative value.

Figure 3:
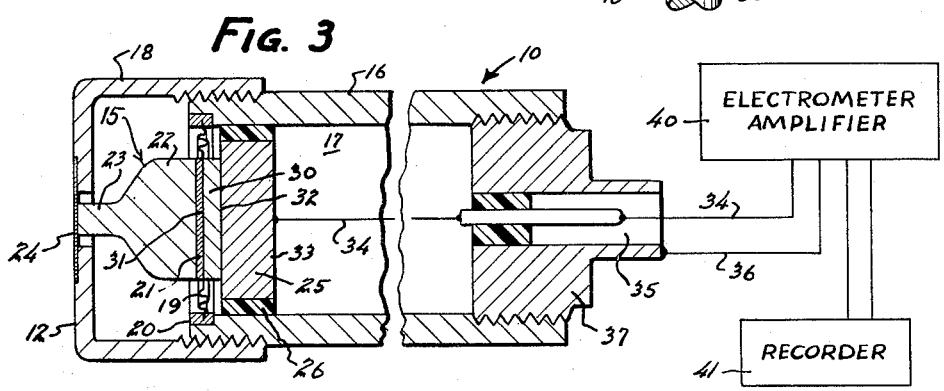
FIG. 3 is a view in elevation and in section of a tonometer shown in combination schematically with an amplifier and recorder according to the present invention.

In the form of the invention shown in FIG. 3 the probe 10 is comprised of a cylindrical body shell 16 having an internal cavity 17 and connected to a nose piece 18 which is threaded to the forward portion of the body shell 16. The body shell 16 is preferably made from nickel-steel or some suitable metal having a low temperature co-efficient of expansion. The nose piece 18 having the flat annular pressure plate 12 may be made from some similar metal material or a plastic material such as Lucite.

At the end of the body shell 16 is mounted an annular metal diaphragm 19 which is fixed around its outer edge to an insert ring 20 that in turn is fixed to the body shell 16. Connected around the inner edge of the diaphragm 19 is a first conductive metal disc 21. Mounted on the first rigid metal disc 21 is a block 22 preferably of some non-conductive material such as Lucite and having a forward tapered portion 23 terminating with a flat end face that is adjacent to a thin yieldable metal disc 24. The disc 24 is mounted on and recessed slightly to be flush with the pressure plate 12, and it prevents moisture or dirt particles from penetrating the probe cavity 17.

Rearward to the metal disc 21 in the cavity 17 is mounted a second rigid metal backing disc 25 which is retained within the body shell 16 by an annular insulating support 26. Between the front and rear metal discs 21 and 25 is mounted an X-cut quartz crystal 30 whose front and rear faces 31 and 32 are engaged by the first and second discs 21, 25 respectively. A thin layer of some suitable adhesive material may be used to bond the metal discs 21 and 25 to the faces 31 and 32 of the crystal 30.

Attached to the rear face 33 of the second metal back-up disc 25 is a central lead 34 for a coaxial cable 35 which has an outer conductor 36. The coaxial cable 35 is conveniently mounted in an end plug 37 that is threaded in the rear end of the body shell 16. Thus, the lead 34 provides for current flow from the rear face 32 of the crystal 30 through the disc 25.

The flow of current from the front face 31 of the crystal 30 is through the front metal disc 21, the metal diaphragm 19, the body shell 16 and into the outer conductor section 36 of the coaxial cable 35. Other well known means may be used for carrying the relatively small current generated by the crystal 30 from the probe 10, within the scope of the invention.

The leads 34 and 36 in the form of the coaxial cable 35 extend from the probe 10 and are connected to a suitable electrical signal sensing and amplifying device such as a standard electrometer amplifier 40 which is a high input impedance, low-grid current amplifier. The amplifier 40 is then connected to a recording or indicating device 41 such as a pen-writer so that each engagement of the tonometer probe 10 with an eyeball 9 can be recorded and then analyzed and evaluated in terms of intraocular pressure.

From the above description the operation of the tonometer 10 in FIG. 3 according to the invention may be readily apparent. As a measurement of intraocular pressure is taken, the nose piece 18 is pressed against the patient's eyeball 9 as shown in FIGS. 1 and 2 until an area 14 on the eyeball 9 is engaged which is large enough to cover the opening 13 in the nose piece 18 as well as the annular pressure plate 12. Since the pressure plate 12 is absorbing all the bending forces of the cornea, only the intraocular pressure bears directly on the central open area 13. Within the area 13, the Lucite compression block 22 under the thin yieldable metal disc 24 is pressed inwardly against the rigid front metal disc 21. The metal diaphragm 79 allows the front metal disc 21 to yield inwardly a very small amount and to press the crystal 30 against the rigid rear metal disc 25. This increase in pressure on the crystal 30 creates, through the piezo-electrical effect, an electrical potential across the inner and outer surfaces 31 and 32 of the crystal 30. Thus, current flows in the lead 34 that extends rearwardly through the body shell 16 and forms the central lead of the coaxial cable 35 and also in the lead 36 that forms the outer portion of the coaxial cable 35 as described above.

The current thus carried by the coaxial cable 35 is directed to the electrometer amplifier 40 which amplifies this signal received and transmits it to the recording or electrical measuring device 41 to provide a quantitative value proportional to the intraocular pressure.

Figure 4:
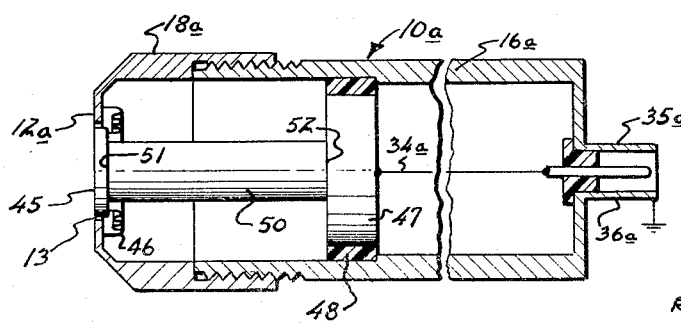
FIG. 4 is an enlarged fragmentary view in elevation and in section of a modified form of the invention.

A slightly modified form of the present invention is shown in FIG. 4. Here a circular metal contact plate 45 is mounted within the opening 13 in a nose piece 18a attached to the body 16a of a tonometer probe 10a. On the rear side of the contact plate 45 is connected an annular metal diaphragm 46 which is also connected around its outer edge to the inner side of the nose piece 18a. With no pressure applied to the contact plate 45, it is normally flush with the surrounding pressure plate 12a of the nose piece 18a. Within the body shell 16a of the tonometer 10a is fixed a rigid metal backing block 47 which is mounted in an annular support 48 of insulated material such as a plastic. Extending rearwardly from the backing block 47 is a central lead 34a for a coaxial cable 35a having an outer lead 36a. Extending between the contact plate 45 and the block 47 is a quartz crystal 50, that is capable of producing an electrical impulse proportional to the pressure placed upon it.

The operation of the tonometer 10a in FIG. 4 is similar to that of the tonometer 10 shown in FIG. 3. The nose piece 18a is applied gently to the eye 9 and an eyeball area 14 greater than the area of the yieldable contact plate 45 is flattened by the annular pressure face 12a so that only the intraocular pressure is bearing on the plate 45. The metal contact plate 45, being yieldable by means of the metal diaphragm 46, presses directly on the crystal 50 which is held rigidly by the backing block 47. An electrical potential is therefore created due to the piezo-electrical properties of the crystal 50. This electrical current is carried from the tonometer 10a through the coaxial cable 35a by the outer conductor portion 36a of the cable which is electrically connected through the body shell 16a, the metal diaphragm 46 and the metal contact plate 45 to the outer surface 51 of the crystal 50; and by the backing block 47, and the central coaxial lead 36a which are connected electrically to the rear surface 52 of the crystal 50.

Our novel structure provides an improved tonometer that is rugged, yet accurate and reliable. These features result from an arrangement of elements that essentially eliminates the need for moving parts with close tolerances, and these elements can be efficiently packaged in a probe device that can be easily manipulated. The present invention in utilizing the advantages of a piezo-electrical system for measuring true intraocular pressure provides a tonometer that is free from the extraneous error-creating factors inherent in prior art devices. A particular advantage of the invention is that the low mass of our probe components reduces inertia effects to a minimum which is important where tests under severe acceleration forces are required.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A device for measuring the intraocular pressure of an eyeball, comprising: an instrument probe having a body portion with an open chamber therewithin and a flat contact surface at one end thereof, said contact surface having an opening therein connected with said open chamber; a pressure-transducing means comprising a crystal having piezo-electrical properties and mounted within said open chamber; a pressure transmitting member having an end surface normally coplanar with said contact surface for transmitting pressure exerted against said opening in said contact surface to said crystal; resilient mounting means fixed to said latter member and to the inside of said open chamber, said mounting means being adapted to maintain the end surface of said pressure transmitting member in a coplanar position with said contact surface when the probe is not engaged with an eyeball; and means for transmitting an electrical signal produced by the pressure on said crystal from said probe, said signal being proportional to the intraocular pressure when said eyeball is engaged by said contact surface.

2. A tonometer comprising: a hand-held probe having a main body portion and a fixed pressure plate at one end thereof, said pressure plate having a generally flat rigid contact surface surrounding an opening; a piezo-electrical crystal plate mounted in said body portion; a rigid backup plate of conductive material fixed within said body portion and adjacent said crystal; a pressure-transmitting means for pressing said crystal against said backup plate, said pressure transmitting means having an end surface normally flush with said fixed pressure plate; resiliently yieldable diaphragm means fixed to said pressure transmitting means and to the inside of said body portion, said diaphragm means being adapted to support said pressure transmitting means within the probe and to maintain its end surface in a coplanar position with said rigid contact surface when the probe is not engaged with an eyeball; means for carrying a flow of current originating in said crystal from said probe, said current being proportional to the pressure on said flat end surface of said pressure transmitting means; and means for measuring the current output from said crystal in terms of intraocular pressure when the pressure plate is pressed against the eyeball to flatten the area around the periphery of said opening.

3. A tonometer comprising: a hand-held probe having a main body portion and a fixed pressure plate at one end thereof, said pressure plate having a generally flat rigid contact surface surrounding an opening; a piezo-electrical crystal mounted in said body portion and having a front and rear surface; a backup plate of conductive material fixed within said body portion and forming a rigid support adjacent said rear crystal surface; a conductive disc means for pressing said crystal against said backup plate, said disc means having an outer surface normally flush with said fixed pressure plate; a resiliently yieldable annular means attached to said disc means and to the inside of said body portion for maintaining the outer surface of said disc means coplanar with said rigid contact surface of the probe when it is not engaged with an eyeball; means for carrying a flow of current originating in said crystal from said probe, said current being proportional to the pressure on said flat end surface of said disc means; and means for measuring the current output from said crystal in terms of intraocular pressure when the pressure plate is pressed against the eyeball to flatten the area around the periphery of said opening.

References Cited in the file of this patent

UNITED STATES PATENTS

| | | |
|---|---|---|
| 2,096,826 | Schrader | Oct. 26, 1937 |
| 2,275,256 | Fried | Mar. 3, 1942 |
| 2,831,478 | Uddenberg et al. | Apr. 22, 1958 |
| 2,966,795 | Smyth | Jan. 3, 1961 |